United States Patent [19]
O'Neill

[11] Patent Number: 5,941,492
[45] Date of Patent: Aug. 24, 1999

[54] APPLIANCE MOUNTING APPARATUS

[75] Inventor: Edward L. O'Neill, Castro Valley, Calif.

[73] Assignee: Lucasey Manufacturing Corporation, Oakland, Calif.

[21] Appl. No.: 08/884,512

[22] Filed: Jun. 27, 1997

[51] Int. Cl.[6] .................................................. A47H 1/10
[52] U.S. Cl. ................................ 248/317; 248/917
[58] Field of Search .................... 248/317, 318, 248/689, 688, 693, 915, 917, 327, 610, 612; 211/113; D8/373; D14/224; 352/243

[56] References Cited

U.S. PATENT DOCUMENTS

| | | | |
|---|---|---|---|
| D. 309,562 | 7/1990 | Boscacci et al. | D8/373 |
| D. 322,210 | 12/1991 | Boscacci et al. | D8/363 |
| D. 386,187 | 11/1997 | Alsabrook, Sr. | D14/224 |
| 4,101,103 | 7/1978 | Mooney | 248/58 |
| 5,064,161 | 11/1991 | Anderson | 248/317 |
| 5,310,152 | 5/1994 | O'Neill | 248/329 |
| 5,368,270 | 11/1994 | Wiwczar | 248/610 |
| 5,393,025 | 2/1995 | Franklin | 248/317 |
| 5,400,993 | 3/1995 | Hamilton | 248/278 |

*Primary Examiner*—Ramon O. Ramirez
*Assistant Examiner*—Gwendolyn Baxter
*Attorney, Agent, or Firm*—Niro, Scavone, Haller & Niro

[57] ABSTRACT

An appliance mounting device that uses a first plate connected to a second plate by two opposingly located support plates in order to form a frame which circumscribes an appliance within the mounting device.

4 Claims, 3 Drawing Sheets

APPLIANCE MOUNTING APPARATUS

BACKGROUND OF THE INVENTION

The present invention relates to improvements in an apparatus for securing an appliance such as a television to a supporting surface. More particularly, it has been found that prior art mounting devices are generally bulky in construction and, as a result, they have prominent profiles that are easily noticed. For example, prior art mounting devices typically employ unattractive support elements such as tubing, angle-iron, and I-beams. Consequently, there is a need for a mounting device that has a less noticeable profile and is more aesthetically pleasing.

SUMMARY OF THE INVENTION

The present invention is, therefore, directed to an apparatus for mounting an appliance to a support surface such as a wall or ceiling. In a preferred embodiment, the present invention provides an aesthetically pleasing low profile as a result of its unique design and construction. The present invention is comprised of a first plate, opposing support plates, and a second plate that are configured to form a frame that circumscribes an appliance and maintains the appliance by a clamping action as a result of the plates being coextensively urged against the appliance. This also produces an attractive device that has a less noticeable low profile. By "low profile" it is meant a device were the visible height (thickness) of the device is substantially less than the width and length of the device.

BRIEF DESCRIPTION OF THE DRAWINGS

The novel features which are characteristic of the present invention are set forth in the appended claims. The invention itself, however, together with further objects and attendant advantages, will be best understood by reference to the following description taken in connection with the accompanying drawings in which:

DETAILED DESCRIPTION OF THE PREFERRED EMBODIMENTS

With particular reference to FIGS. 1–4, a preferred appliance mounting apparatus embodying the present invention is designated generally as 10 and shown enclosing a TV 12 within it. While the invention will be hereafter described with respect to TV 12, the invention is not so limited, and may find useful application with other appliances.

Figure 6:
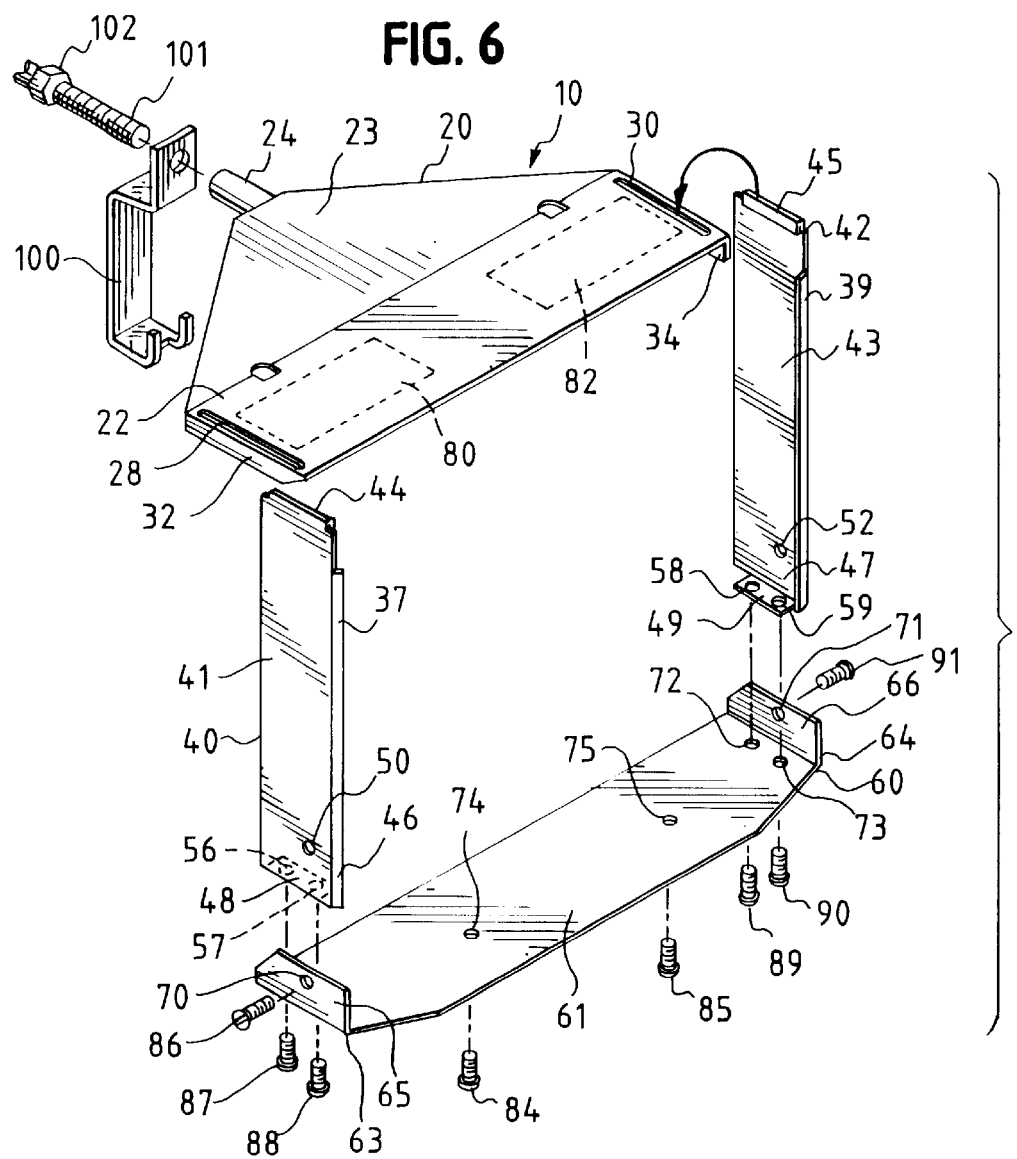
FIG. 6 is an exploded perspective view of the embodiment shown in FIG. 1 in a disassembled state, with portions removed to reveal aspects of the embodiment.

As shown in FIG. 6, apparatus 10 includes a planar first plate 20 which may be made of a one-piece construction from stamped metal being no more than 5/64th of an inch in thickness. Using such a thin plate also permits TV 12 to be mounted in close proximity to a ceiling if desired. This, in turn, improves the aesthetic appearance by hiding plate 20 from view or limiting the amount of plate 20 that is seen by an observer.

As also shown in FIG. 6, first plate 20 includes a planar rectangular portion 22 and an extended portion 23 that converges at a point containing a post 24 which includes internal threads (not shown). Rectangular portion 22 of first plate 20 also includes opposingly located slots 28 and 30 and extended perpendicular flanges 32 and 34.

As also illustrated in FIG. 6, apparatus 10 includes opposing support plates 40 and 42 which are mirror images of each other. As with first plate 20, the support plates may be of a one-piece construction that is no more than 1/16th of an inch in thickness. As shown, support plates 40 and 42 have planar sections 41 and 43 and are generally rectangular in shape and also have opposingly located longitudinally extending flanges 37 and 39. The plates terminate in ends having bent lips 44 and 45 and opposingly located ends 46 and 47 that have extended perpendicular flanges 48 and 49. Support plates 40 and 42 also include mounting apertures 50 and 52 located on planar portions 41 and 43 near ends 46 and 47 and internally threaded mounting apertures 56–59 which are located on extended flanges 48 and 49.

Apparatus 10 also includes a second plate 60 which may also be of a one-piece construction that is no more than 1/16th of an inch in thickness. As shown, second plate 60 includes a planar section 61 and is generally rectangular in shape. Second plate 60 also terminates in opposingly located ends 63 and 64 that have extended perpendicular flanges 65 and 66. Further included are mounting apertures 70–77 which are located on flanges 65 and 66 and the planar portion 61 of the plate.

To assemble and operate device 10, first plate 20 is positioned upside down on a suitable support surface. TV 12 is inverted and the rectangular portion of its housing is placed on rectangular portion 22 of first plate 20. In addition, as illustrated in FIG. 6, non-slip pads 80 and 82 may be provided.

Figure 7:
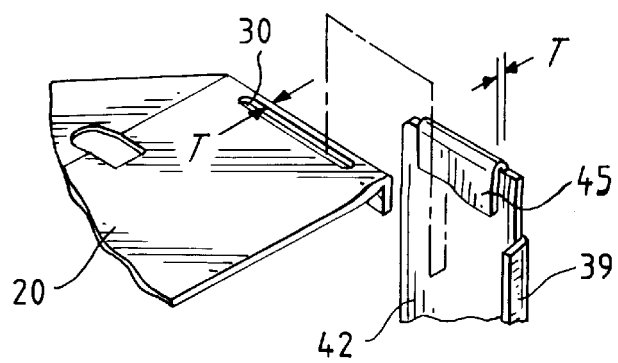
FIG. 7 is a partial, exploded perspective showing how a support plate connects to the joining side plate.

Next, as shown in FIG. 7, bent lip 45 of support plate 42 is inserted into slot 30 of first plate 20. This same operation is then repeated for bent lip 44 and corresponding slot 28. The length of plate 20 should be slightly greater than the width of the appliance so that the appliance is securingly retained and that the plates are urged against the appliance. This ensures that support plates 40 and 42 co-extensively engage the appliance. In addition, once the bent lips are inserted through the slots, they act as stops that maintain the engagement between the support plates 40 and 42 and first plate 20 by preventing the downward and sideways movement of the plates when the complete device is assembled and in use.

Second plate 60 may then be affixed to TV 12 by inserting threaded fasteners 84 and 85 through holes 74 and 75 and into any bosses that exist on the TV. Second plate 60 is then attached to support plates 40 and 42 by inserting screws 86–91 into the corresponding internally threaded apertures as illustrated in FIG. 6. Tightening screws 86–91 creates additional forces which urge plates 20, 40, 42, and 60 up against the appliance and into a co-extensive relationship with the appliance. In this manner, the appliance is securingly clamped on all four sides by the plates which circumscribe it.

To ensure that first plate 20 and second plate 60 are urged against the appliance, the length of planar sections 41 and 43 of support plates 40 and 42 should be slightly less than the height of the appliance. Sizing the plates in this manner results in fasteners 87–90 forcing plate 60 up against TV 12 and also the fasteners pull plate 20 down onto TV 12. In addition, the use the fasteners allows the device to be adjusted to accommodate appliances of varying heights.

Figure 1:
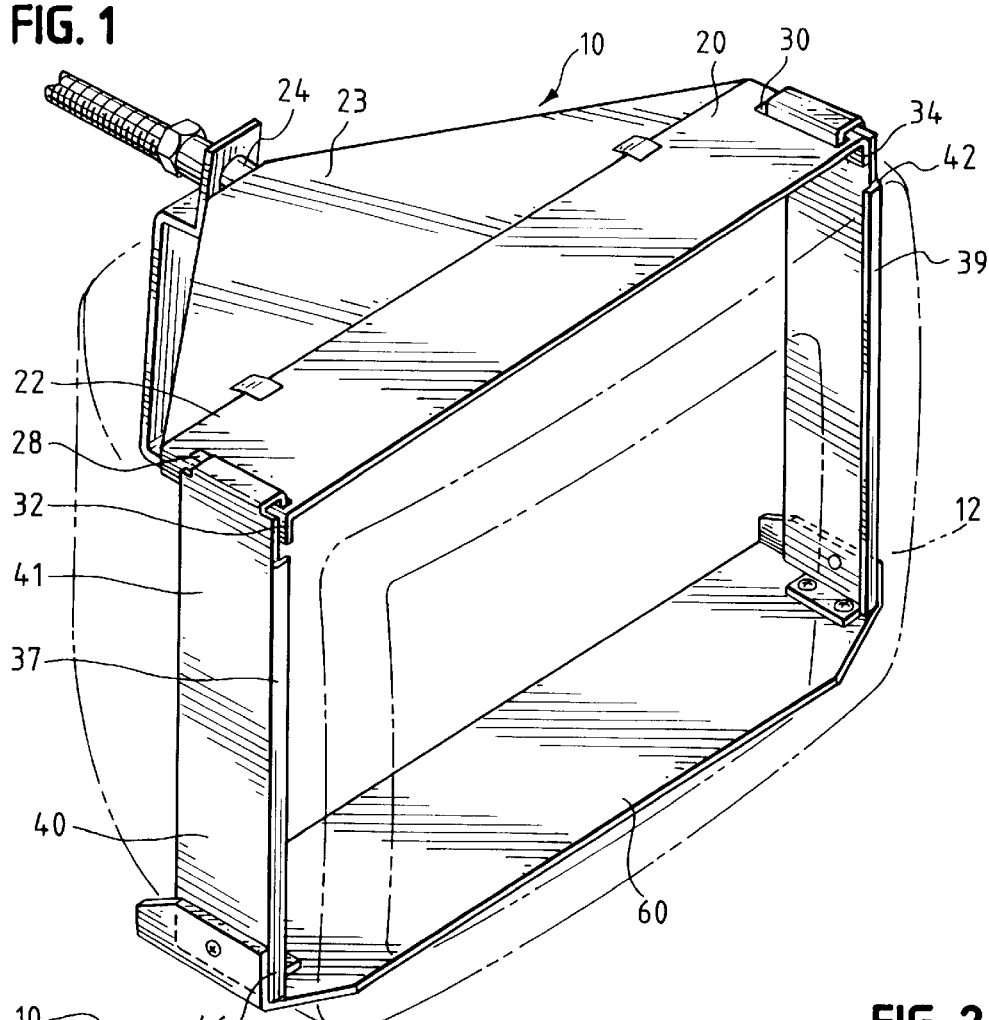
FIG. 1 is an perspective view of one embodiment of the invention.
Figure 2:
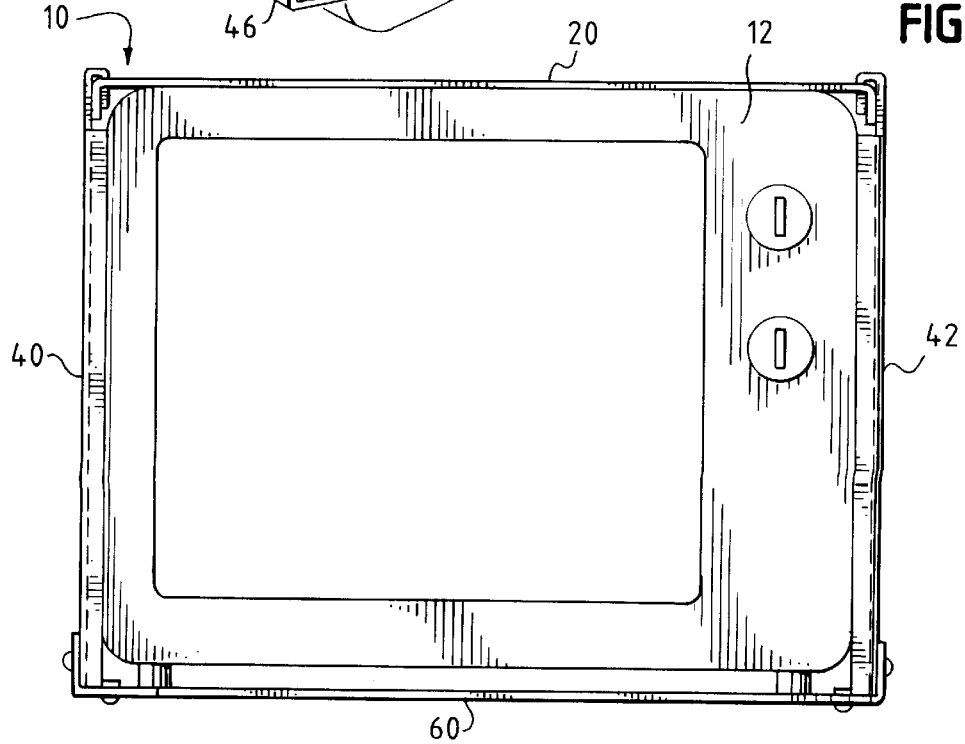
FIG. 2 is a front view showing the low profile created by the invention when fully assembled around a television.
Figure 3:
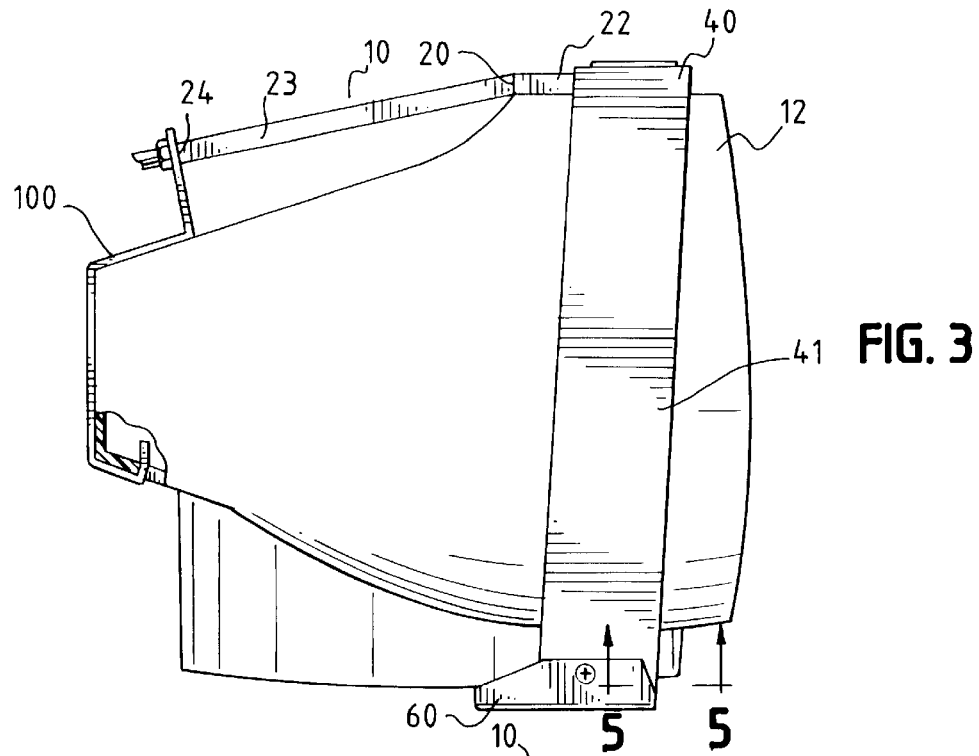
FIG. 3 is side view of the embodiment illustrated in FIG. 1.
Figure 4:
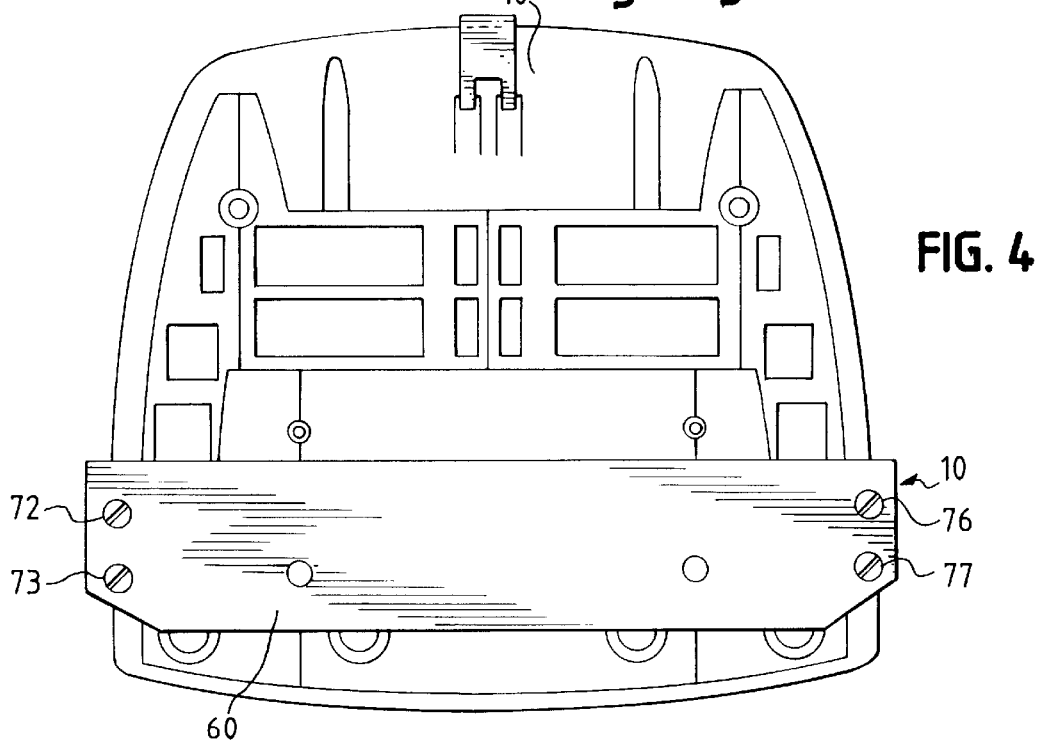
FIG. 4 is a bottom view of the embodiment illustrated in FIG. 1.
Figure 5:
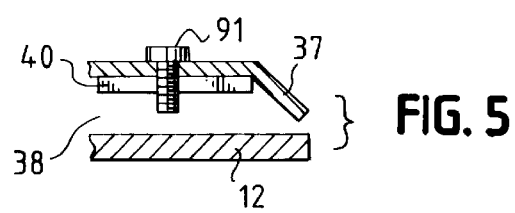
FIG. 5 is an exploded cross-sectional view taken along line 5—5 of FIG. 4.

Moreover, as shown in FIG. 5, flange 37 creates a space 38 that permits fastener 91 to be inserted free from interference with the side of the appliance by abuttingly engaging the side of TV 12. A similar space is also created by the engagement of flange 39 against the opposingly located side of TV 12. The engagement of flanges 37 and 39 against the sides of the appliance also increases the aesthetics of the unit by creating the appearance that device 10 and TV 12 are one unit.

It has also been found that the width of the planar sections of the plates should be between 10–25% of the overall width of the appliance. It has been found that sizing the plates in this manner provides acceptable support for the appliance.

For additional support, a safety strap 100 made of metal or some other rigid material may be used to support the rear of TV 12. As shown in FIG. 6, one end of strap 100 is affixed to post 24 by bolt 101 and the other end may be attached to the rear of TV 12 by adapting strap 100 to engage TV 12 as shown. In addition, strap 100 may also be affixed to TV 12 by the use of fasteners and other known fastening means.

Strap 100 operates to prevent the weight of TV 12 from buckling plate 20 by counteracting the downward force generated by TV 12. For larger appliances the weight of the appliance tends to bend plate 20 downwardly and at the same time it also raises the rear of TV 12 upwardly. Strap 100 counteracts this movement by stabilizing the rear of TV 12 by linking it to bolt 101 which counteracts the downward force created by the appliance.

Final assembly is accomplished by tightening bolt 101 until hex nut 102 is securely forces safety strap 100 up against post 24. After this operation is completed, the appliance may be mounted upon a preexisting bracket (not shown).

Since the plates are designed to be releasable, the device may also be disassembled. To do this, the operations described above are performed in reverse order.

It will be appreciated by those skilled in the art that various changes and modifications can be made to the illustrated embodiment without departing from the spirit of the present invention. All such modifications and changes are intended to be covered by the appended claims.

What is claimed is:

1. An appliance mounting device for securing an appliance to a support surface comprising:

a frame formed from a first plate, a second plate, and two opposingly located support plates, said frame adapted to circumscribe said appliance;

said first plate including two opposingly located slots and a planar section that is adapted to co-extensively engage said appliance;

said support plates include bent lips which are releasably inserted through said slots to connect said first plate to said support plates, said support plates are further adapted to include planar sections that co-extensively engage said appliance and a plurality of mounting apertures;

said second plate including a planar section that is adapted to co-extensively engage said appliance and having a plurality of mounting apertures;

said mounting apertures of said support plates positioned to correspond with said mounting apertures located on said second plate;

fasteners insertable into said mounting apertures to releasably connect said second plate to said support plates by operation of said fasteners; and said operation of said fasteners biases said first and second plates towards said appliance to clamp said appliance securingly within said mounting device.

2. The appliance mounting device of claim 1 further comprising support plates having widths adapted to be 10–25% of the width of the appliance.

3. The appliance mounting device of claim 1 wherein the thickness of said plates is less than ⅛th of an inch.

4. The appliance mounting device of claim 1 further including a strap, said strap connected to said appliance and is adapted to help support the weight of said appliance.

* * * * *